Sept. 18, 1956

A. ORTUSI ET AL 2,763,860

HERTZIAN OPTICS

Filed Nov. 24, 1950

Inventors
Antoine Ortusi
Jean Claude Simon
By

Sept. 18, 1956 A. ORTUSI ET AL 2,763,860
HERTZIAN OPTICS
Filed Nov. 24, 1950 7 Sheets-Sheet 2

Sept. 18, 1956     A. ORTUSI ET AL     2,763,860
HERTZIAN OPTICS
Filed Nov. 24, 1950     7 Sheets-Sheet 3
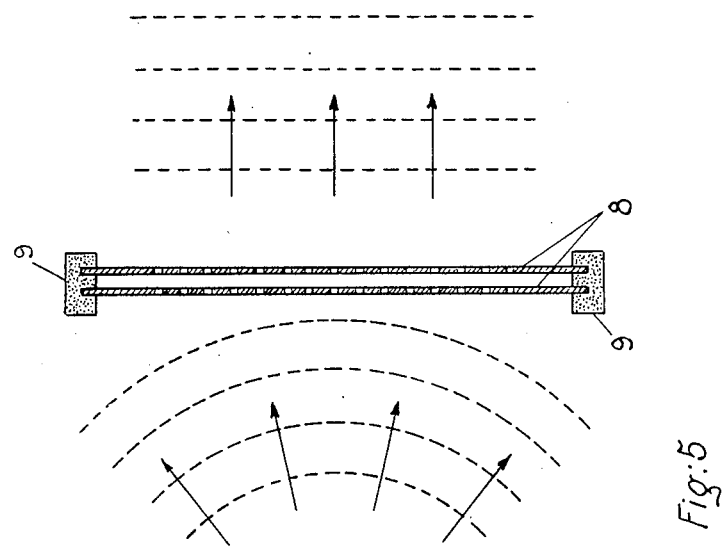
Fig.5
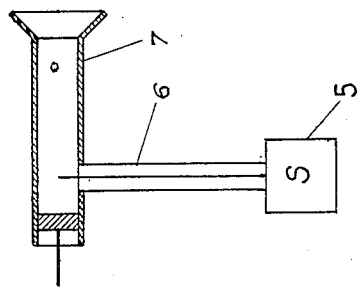
Inventors
Antoine Ortusi
Jean Claude Simon
By Michael S. Striker

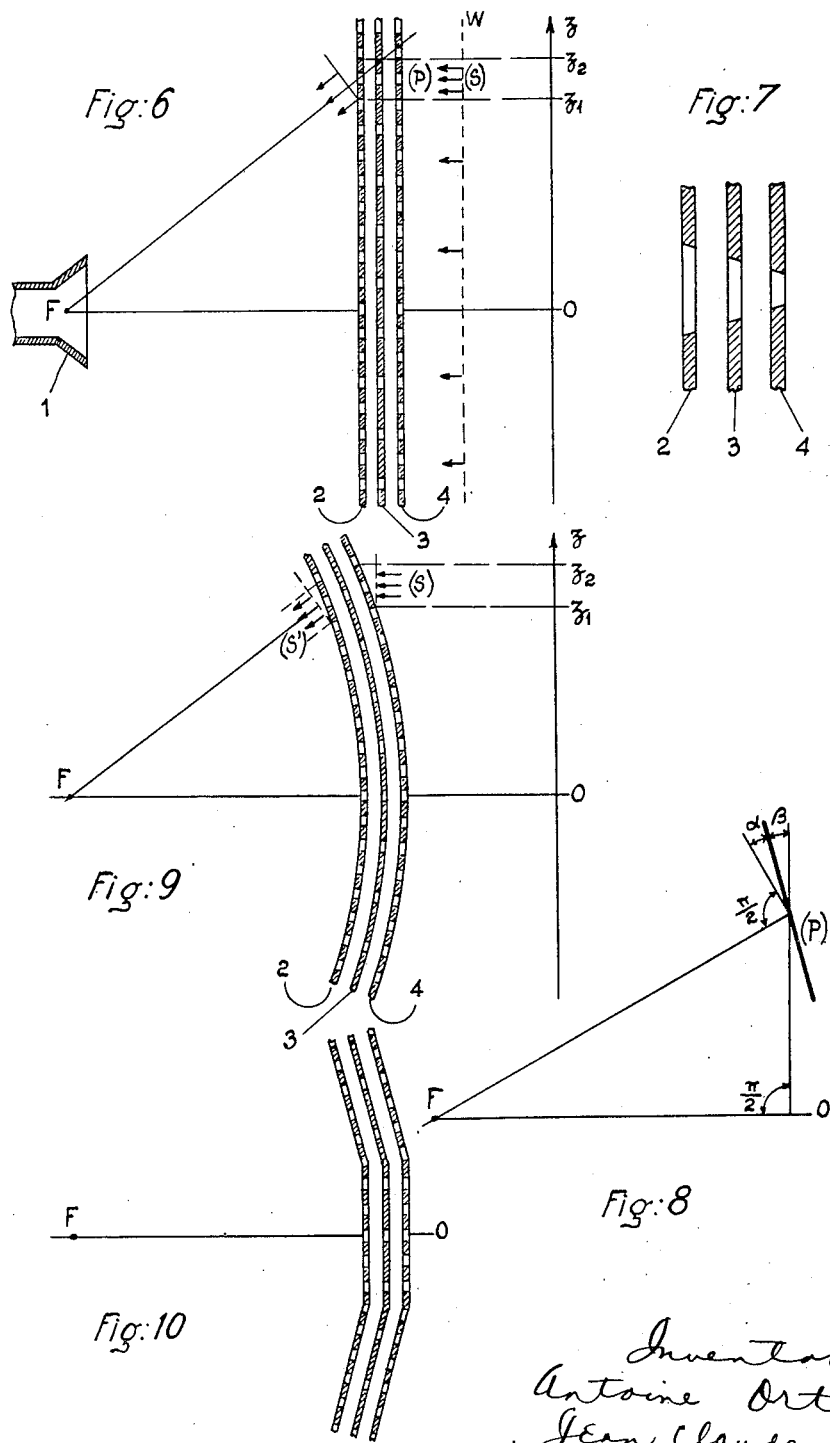

Sept. 18, 1956  A. ORTUSI ET AL  2,763,860
HERTZIAN OPTICS
Filed Nov. 24, 1950  7 Sheets-Sheet 5
*Fig:12*
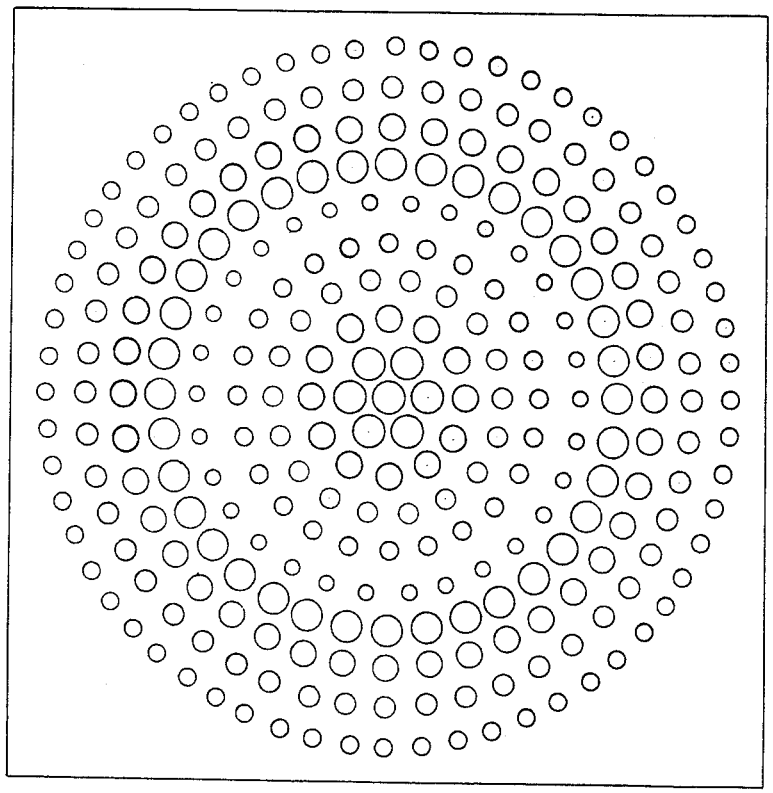
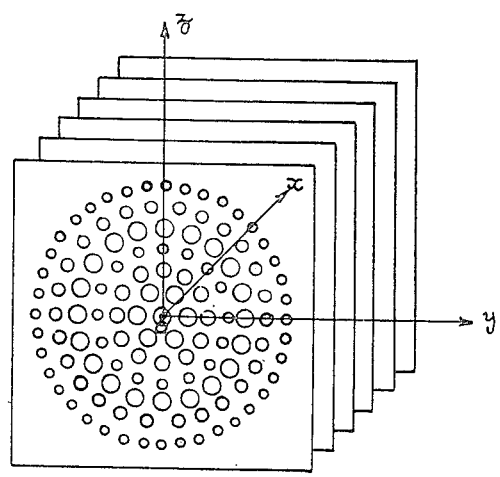
*Fig:11*
Inventors
Antoine Ortusi
Jean Claude Simon

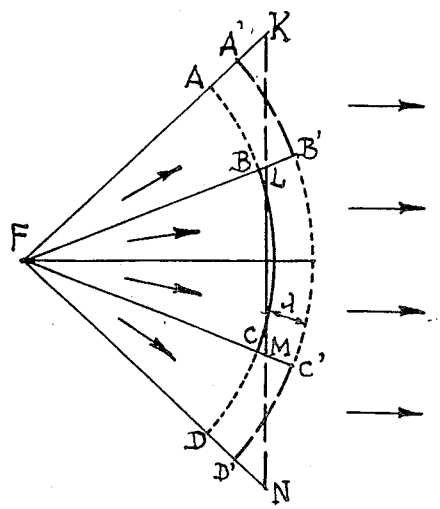
Fig:13
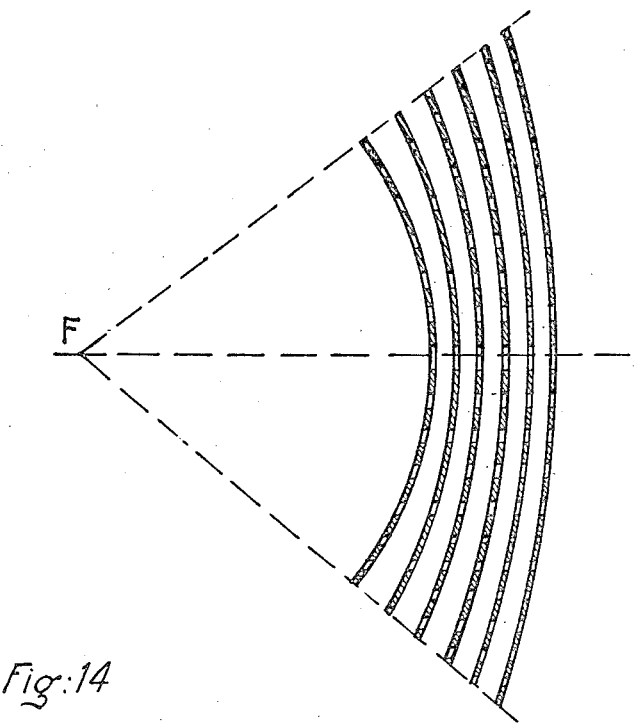
Fig:14

Sept. 18, 1956   A. ORTUSI ET AL   2,763,860
HERTZIAN OPTICS
Filed Nov. 24, 1950   7 Sheets-Sheet 7
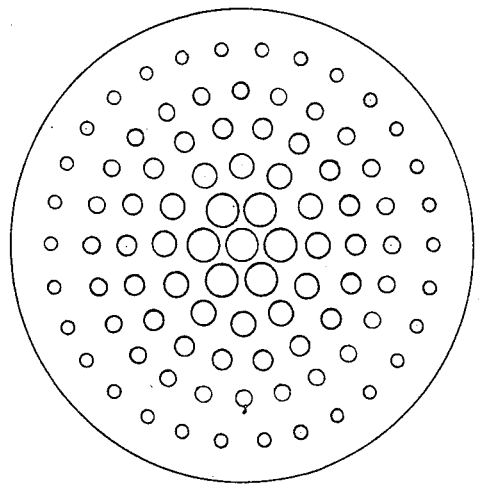
Fig: 15
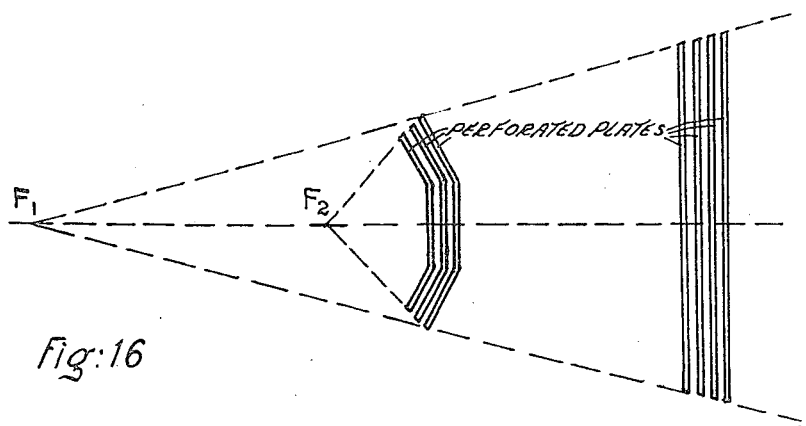
Fig: 16
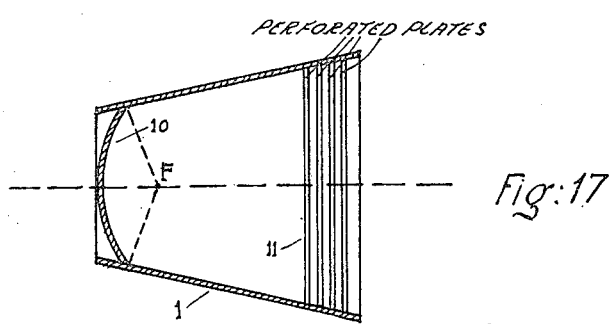
Fig: 17
Inventors
Antoine Ortusi
Jean Claude Simon
By Michael S. Striker

United States Patent Office 2,763,860
Patented Sept. 18, 1956

2,763,860

HERTZIAN OPTICS

Antoine Ortusi and Jean Claude Simon, Paris, France, assignors to Compagnie Generale de Telegraphie Sans Fil, a corporation of France Application November 24, 1950, Serial No. 197,202

Claims priority, application France December 3, 1949

14 Claims. (Cl. 343—753)

The present invention relates to electromagnetic waves of ultra high frequency and more particularly to new and improved apparatus for transforming curved ultra high frequency waves and particularly spherical waves into plane waves and vice versa.

Embodiments for focusing with electromagnetic lens are already known, and usually consist of either a homogeneous dielectric mass or a small conductive body, distributed in a dielectric mass. Either of these embodiments provides a volume possessing special contours, the focusing effect being due to refraction in layers of different thicknesses. Great precision is necessary in the making of such volumes and, as a consequence, their manufacture is difficult and costly.

The object of the present invention is a device that will render short electromagnetic waves convergent or divergent with the aid of an extremely simple and economic apparatus.

This device comprises one or several perforated metal plates, the thickness of which is uniform and preferably very small (of the order of 1 millimeter). The perforations consist of a series of holes suitably distributed over the area of each plate. The holes or apertures have transverse dimensions, e. g. diameters in the case of circular holes, which are smaller than the shortest wavelength of the waves employed. Preferably the holes of the plates have a total area not exceeding the area of the metallic surface of the plate.

The functioning of this device is based on the well known phenomenon of diffraction. It is known that a wave meeting an obstacle consisting of a perforated screen is deformed by the latter if the perforations of the screen are small in comparison to the wave length of the wave. If the wave traversing the hole starts with the same phase as the wave striking the obstacle, the wave traversing the hole will be ahead of the wave striking the obstacle since it will be attenuated by a smaller amount. This phase advance thus acquired is the greater the smaller the orifice is, and can attain theoretically $$\frac{\pi}{2}$$

for an infinitely small hole. If, on the other hand, the waves arriving under different inclinations pass through the same hole, the apparent diameter of this hole for the different waves varies as the cosine of the angles of incidence (angles included by the incident ray and the normal to the screen surface). The dephasing will be therefore more pronounced for the inclined beams than for the ones having an angle of incidence being equal to zero and will be the greater, the greater the inclination is. Thus a curved "equiphased" surface (geometrical locus of the points having the same phase) can be converted in a plane surface or vice versa, after passing through the holes.

According to the present invention, a convergent or divergent effect is produced by diffraction at the surface of conductive plates in contradistinction to known lenses operating by refraction, in a volume having parts of different thicknesses.

According to an embodiment of the present invention, in order to obtain a focusing effect and a transmission coefficient of about 1 at the same time, two or more plates are placed in the trajectory of the waves, one behind the other. All these plates consisting of metal and having uniform thickness, may have holes of the same or different shapes and arrangements, the relative spacings of the holes being determined according to the filter effect to be obtained.

In order to better understand the present invention some embodiments thereof are described with reference to the annexed drawings in which:

Fig. 5 shows a second embodiment of the present invention;

Fig. 6 shows a third embodiment of the present invention;

Fig. 7 shows a detail of Fig. 6 on a larger scale;

Fig. 8 is a diagram for explaining the operation of the embodiment shown in Fig. 9;

Figs. 9, 10 and 11 show, respectively, three more embodiments;

Fig. 12 is a detail of Fig. 11 on an enlarged scale;

Fig. 13 is a diagram for explanation of the device shown in Figs. 11 and 12;

Fig. 14 shows another embodiment of the present invention;

Fig. 15 represents a detail of the device shown in Fig. 14; and

Figs. 16 and 17 are examples, respectively of associations of lenses according to the present invention.

Fig. 1 represents an electromagnetic "horn" 1 in front of which are placed, according to the present invention, three perforated metal plates 2, 3 and 4.

Figure 3:
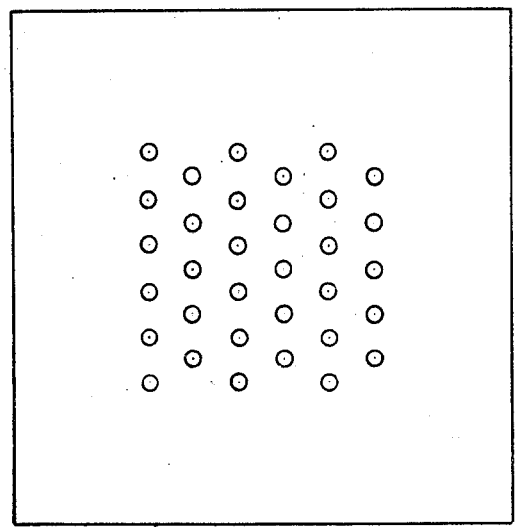
Figs. 2 and 3 show, respectively, small parts of Fig. 1 in end elevation and plan view.
Figure 2:
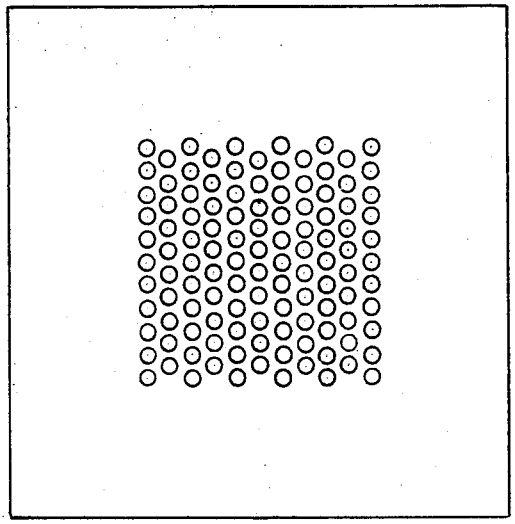

Fig. 2 shows in detail the two outer plates 2 and 4 which are identical, and Fig. 3 represents the middle plate 3, which is different from the other two. All three plates have the same dimensions—1m. x 1m. x 2mm. thick—and comprise holes of 3 centimeters diameter arranged in a square of .50 meter. Only the number of holes vary and, consequently, their spacing. In the outer plates (Fig. 2) the centers of the holes are spaced 4 centimeters apart and in the middle plate (Fig. 3) these spaces are 9 centimeters.

A generator (not shown) produces in the "horn" 1 decimetric waves such as waves of $H_{01}$ type, these waves forming a divergent beam in the "horn." The perforated plates placed according to the present invention on the path of the divergent beam, has the effect of transforming it into a parallel beam. The convergent action is produced principally in the middle plate 3, the outer plates 2, 4 acting as a band pass filter.

Figure 4:
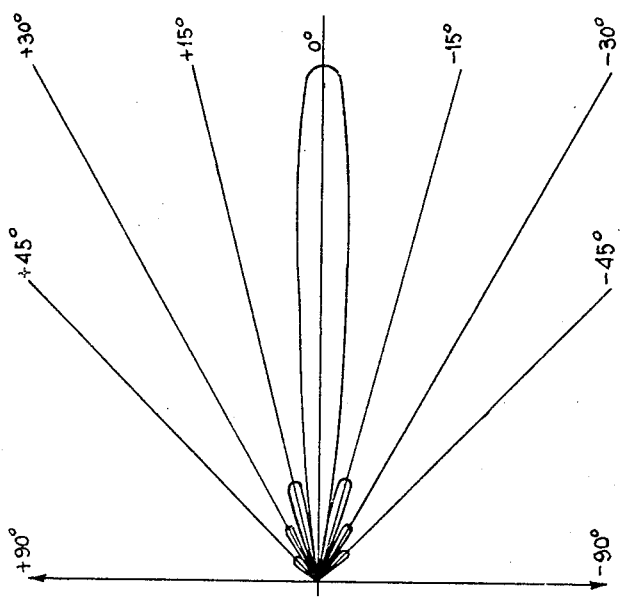
Fig. 4 is a radiation diagram obtained by the use of the device shown in Fig. 1.

The diagram shown in Fig. 4, indicates the radiating power as a function of the direction, at a distance of 25 meters for waves of the order of 15 centimeters. It appears clearly in this diagram that the energy radiated by the transmitter is propagated in a narrow beam around the central axis, perpendicular to the plates.

Fig. 5 shows another embodiment of the present invention. A source 5 of very high frequency is coupled by means of a coaxial cable 6 to a part of a guide 7 sending into space spherical waves shown in dotted lines. Two conductive plates 8, perforated according to the present invention and maintained by insulating supports 9, are interposed in the trajectory of the spherical waves and transform the latter into plane waves. The results are comparable to those obtained with the embodiment shown in Fig. 1.

The lens described heretofore gives very satisfactory results when the lens opening is not large, that is when the ratio of the diameter to the focal distance is small.

In the following embodiments of the present invention are described forming a lens the diameter of which has a ratio to the focal distance close to unity (lens with large opening).

Figure 1:
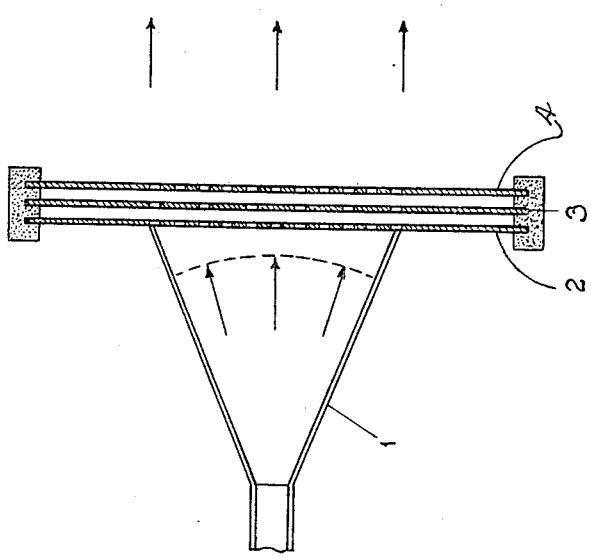
Fig. 1 shows an embodiment of the present invention in side elevation, partly in section.

Fig. 6 shows a small "horn" 1 placed in the focus F of an electromagnetic lens composed of three plates 2, 3 and 4, placed as in Fig. 1 and perforated with holes.

If plates 2 and 4 are similar, and an element P of the lens, distant from its axis, is considered, it is evident that an element S of a plane wave W, perpendicular to the axis of the system, passes the element P under very different inclinations at the entry and the exit of the lens. But the transmission coefficient of a plate as well as its dephasing effect varies according to the angle of incidence. Since the element P is equivalent to a filter element, it is necessary, in order to obtain an optimal transmission in the passing band, to effect the equality of the transmission coefficients of the two symmetric obstacles.

According to another embodiment of the present invention this can be effected by giving larger diameters to the holes of the interior plate 2 than to those of the exterior plate 4 corresponding to the same zones $z$, as indicated in Fig. 7 which shows, on an enlarged scale, the details of the holes.

According to another embodiment of the present invention, the outer plates 2 and 4 are identical and their transmission coefficents are equalized by giving to each element P equal inclinations to the central axis of the system and to the line joining this element to the focus.

This condition is shown by the equality of the angles $\alpha$ and $\beta$ in Fig. 8 and gives to the assembly the form of a rotational paraboloid shown in cross section in Fig. 9 of the annexed drawings. It is seen that, in this arrangement, the exterior plate 4 makes with the element of the incident wave S an angle equal to that which the interior plate 2 makes with the corresponding wave S'. The two plates 2 and 4 have thus equivalent transmission coefficients and the filter effect obtained is optimal.

Since such an arrangement is relatively difficult to accomplish, a simplified embodiment of the present invention consists in replacing the rotational paraboloid by polyhedra circumscribed or inscribed in a paraboloid as shown in Fig. 10 and gives very satisfactory results in practice. The polyhedra consist thus of plane portions each of which has equal inclinations with respect to the axis of the lens system and to the line joining the center of the portion with the focus of the lens.

Fig. 11 shows another embodiment of the present invention. A plurality of similar plates are placed the one behind the other. These plates are perforated with holes of different diameters as shown for example in Fig. 12 which shows, on a larger scale, one of the plates of the assembly shown in Fig. 11. It is seen that the diameters of the holes decrease progressively from the center of the plate until they attain a minimum, then return to their initial value and then again decrease.

The operation of such a lens is illustrated in Fig. 13. Two curved equiphased surfaces ABCD and A'B'C'D' separated by a distance $\lambda$ corresponding to one wave length are considered; they have therefore the same phase at any moment. A central lens LM intercepts the part BC of one of the curved equiphased surfaces and transforms it into a plane surface, and another lens surrounding the first and comprising the parts KL and MN, is adjusted so as to straighten, respectively, the curved parts A'B' and C'D' into the prolongations of LM. The two lenses therefore operate in "steps" in acting on two wave fronts having a distance equal to $\lambda$ which they bring into the same equiphased plane.

The lens shown in Fig. 11 and comprising plates such as that shown in Fig. 12, operates according to the "steps" principle. Even though it is easy to vary the diameters of the holes as a function of $y$ and $z$ (Fig. 11) and maintain them constant in the direction $Ox$, it should be noted that the arrangement can also operate if the diameters of the holes vary with $x$. Further, it is not essential that the holes of the different plates are opposite to one another.

Fig. 12 shows the holes of the same diameter arranged in concentric circles and the focusing thus obtained is the same in the horiozntal and vertical plane. If, on the contrary, a more pronounced convergent or divergent effect in one plane than in another is desired, the holes having equal size are arranged in appropriate ellipses.

According to another embodiment of the present invention a plurality of cambered perforated plates are arranged, one behind the other, as shown in Fig. 14 in cross section, the camber of which decreases with increasing distance from the focus F of the system. The perforations shown in Fig. 15, consist of holes the diameter of which decreases from the center to the edges of the plates; these perforations therefore differ from those of Fig. 12 provided for two "steps" operation. The holes in the different plates are shown as aligned with one another. However, if desired, the holes can be staggered. The number of plates varies according to the desired band width.

Finally, according to the present invention, convergent or divergent systems can be obtained by combining the diverse types of lenses described hereinbefore, or by associating them with mirrors or lenses of known types.

Fig. 16 shows an arrangement consisting of two lenses of types heretofore described. The one shown on the right, of larger dimension and small opening, plays a part similar to that of an objective in optics, whereas the one on the left, of reduced dimensions, has a large opening angle and can be compared to an ocular. Thus, the two lenses cooperate with each other in a similar manner as the objective lens and the eye piece lens of an optical instrument.

Fig. 17 shows a cross section of a "horn" 1, in which a parabolic mirror 10 and a lens 11 according to the present invention are placed. The assembly is not cumbersome and is protected by the "horn" 1 against undesirable radiations at the rear, so that a considerable increase in efficiency and a great gain is achieved.

We claim:
1. Electromagnetic lens for ultra-short waves, said lens having an axis and comprising, in combination, a plurality of metallic plates arranged spaced apart in direction of and substantially transversal to the axis of the lens, the thickness of the plates being very small compared to the shortest wave length of said waves, each of said plates having a plurality of discrete holes, said holes being spaced apart from one another and having dimensions being smaller than the shortest wave length of said ultrashort waves and of the same order of magnitude thereof, the largest distance between any two successive plates of the lens being smaller than the shortest wave length of said ultrashort waves and being of the same order of magnitude thereof.

2. Electromagnetic lens according to claim 1 said plates being perforated in an identical manner.

3. Electromagnetic lens according to claim 1 said plates being three in number, the outer plates having the same number of holes, said number being larger than that of the middle plate.

4. Electromagnetic lens according to claim 1 said holes of said plates having the same diameter.

5. Electromagnetic lens according to claim 1 the two outer of said plates differing each from the other by the diameter of the opposite holes, said holes being adjusted so as to equalise the transmission coefficients of said plates.

6. Electromagnetic lens according to claim 1 said plates being perforated by said holes having different dimensions decreasing from the centre of said plates to a minimum, and increasing again to the initial dimensions and decreasing again so as to create at least two "steps."

7. Electromagnetic lens according to claim 1 the dimensions of said holes decreasing from the centre to the edges of said plates.

8. Electromagnetic lens according to claim 1 and a rectifier and an electromagnetic "horn" enclosing said reflector and said plates.

9. Electromagnetic lens according to claim 1 a second lens of smaller dimensions associated with said lens and an electromagnetic "horn" enclosing said lenses.

10. Electromagnetic lens for ultra-short waves, said lens having an axis and comprising, in combination, a plurality of plane metallic plates arranged spaced apart in direction of and substantially transversal to the axis of the lens, the thickness of the plates being very small compared to the shortest wave length of said waves, each of said plane plates having a plurality of discrete holes, said holes being spaced apart from one another and having dimensions being smaller than the shortest wave length of said ultra-short waves and of the same order of magnitude thereof, the largest distance between any two successive plates of the lens being smaller than the shortest wave length of said ultrashort waves and being of the same order of magnitude thereof.

11. Electromagnetic lens for ultra-short waves, said lens having an axis and comprising, in combination, a plurality of plane metallic plates arranged spaced apart in direction of and substantially transversal to the axis of the lens, the thickness of the plates being very small compared to the shortest wave length of said waves, each of said plane plates having a plurality of circular holes, said holes being spaced apart from one another and having diameters being smaller than the shortest wave length of said ultra-short waves and of the same order of magnitude thereof, the largest distance between any two successive plates of the lens being smaller than the shortest wave length of said ultrashort waves and being of the same order of magnitude thereof.

12. Electromagnetic lens according to claim 1, in which said metallic plates are curved as a paraboloid.

13. Electromagnetic lens according to claim 1, in which each metallic plate consists of a plurality of plane portions, each of which is equally inclined with respect to the axis of the lens and the line joining the center of said portion in the focus of the lens.

14. Electromagnetic lens according to claim 1, in which said holes have different dimensions according to their positions with respect to the center of the plate in which they are bored.

References Cited in the file of this patent

UNITED STATES PATENTS

| | | |
|---|---|---|
| 1,906,546 | Darbord | May 2, 1933 |
| 2,043,347 | Clavier | June 9, 1936 |
| 2,169,553 | Bruce | Aug. 15, 1939 |
| 2,283,935 | King | May 26, 1942 |
| 2,405,992 | Bruce | Aug. 20, 1946 |
| 2,412,202 | Bruce | Dec. 10, 1946 |
| 2,423,648 | Hansell | July 8, 1947 |
| 2,425,533 | Herzog | Aug. 12, 1947 |
| 2,433,924 | Riblet | Jan. 6, 1948 |
| 2,597,825 | Schroeder | May 20, 1952 |
| 2,636,125 | Southworth | Apr. 21, 1953 |

FOREIGN PATENTS

| | | |
|---|---|---|
| 582,007 | Germany | Aug. 7, 1933 |
| 668,231 | Germany | Nov. 28, 1938 |

OTHER REFERENCES

"Metallic Delay Lenses," by W. E. Kock; Bell Telephone System Technical Publication, Monograph B–1519; published in Bell System Technical Journal, vol. 28, pages 58–82, January 1948.